(12) United States Patent
Blanchard

(10) Patent No.: US 6,626,562 B2
(45) Date of Patent: Sep. 30, 2003

(54) LOW PROFILE BACKLIGHT OPTIMIZED FOR LIQUID CRYSTAL DISPLAYS

(76) Inventor: Randall D. Blanchard, 12658 Futura St., San Diego, CA (US) 92130

(*) Notice: Subject to any disclaimer, the term of this patent is extended or adjusted under 35 U.S.C. 154(b) by 0 days.

(21) Appl. No.: 09/974,125

(22) Filed: Oct. 8, 2001

(65) Prior Publication Data

US 2003/0067759 A1 Apr. 10, 2003

(51) Int. Cl.[7] .............................. F21Y 13/02; F21V 7/06
(52) U.S. Cl. .................... 362/346; 362/260; 362/293; 362/297; 362/29
(58) Field of Search ........................ 362/29, 97, 260, 362/263, 246, 561, 557–562, 230, 231, 235, 293, 307, 343, 346, 297; 349/67, 70

(56) References Cited

U.S. PATENT DOCUMENTS

| | | | | |
|---|---|---|---|---|
| 4,385,461 A | * | 5/1983 | Wingfield | 40/352 |
| 5,486,983 A | * | 1/1996 | Cordier et al. | 362/29 |
| 5,567,042 A | | 10/1996 | Farchmin et al. | 362/241 |
| 5,709,463 A | | 1/1998 | Igram | 362/268 |
| 5,720,545 A | * | 2/1998 | Shaw | 362/245 |
| 5,833,360 A | * | 11/1998 | Knox et al. | 362/293 |
| 5,892,621 A | * | 4/1999 | McGregor et al. | 359/599 |
| 5,934,779 A | * | 8/1999 | Leidig | 362/17 |
| 5,971,571 A | * | 10/1999 | Rose | 362/346 |
| 6,062,704 A | * | 5/2000 | Holder | 362/223 |
| 6,235,105 B1 | * | 5/2001 | Hubbard et al. | 106/415 |

FOREIGN PATENT DOCUMENTS

| | | |
|---|---|---|
| FR | 2642209 | 7/1990 |
| JP | 01116528 | 5/1989 |
| WO | WO 01/09671 | 2/2001 |

* cited by examiner

Primary Examiner—Laura K. Tso

(57) ABSTRACT

An apparatus is disclosed that provides back light for liquid crystal displays ("LCD"). The apparatus includes an electrodeless lamp disposed in a cabinet for generating light; and a reflector disposed on one side of the electrodeless lamp for directing light from the lamp in the direction of the LCD. The reflector further includes a surface profile that provides a uniform distribution of light intensity into the LCD. The reflector further is adjacent and in near contact with the lamp to provide a minimum depth behind the lamp. An alternate embodiment of the invention includes an IR reflector disposed between the electrodeless lamp and a diffuser, which is located adjacent the LCD screen.

19 Claims, 3 Drawing Sheets

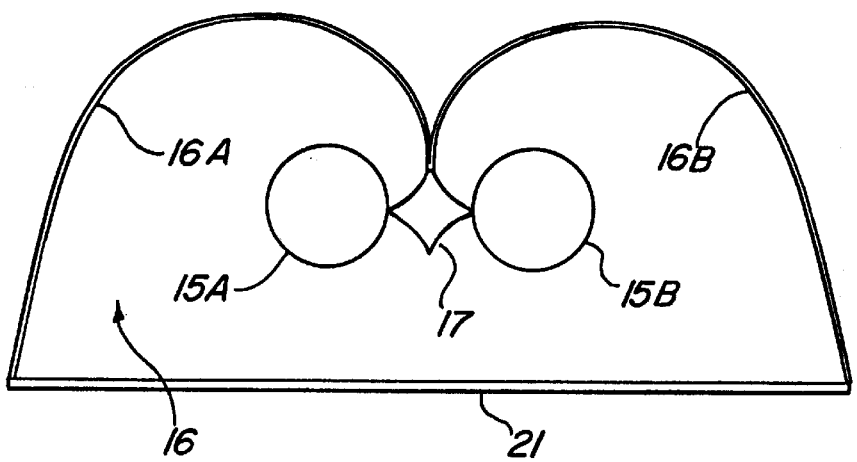
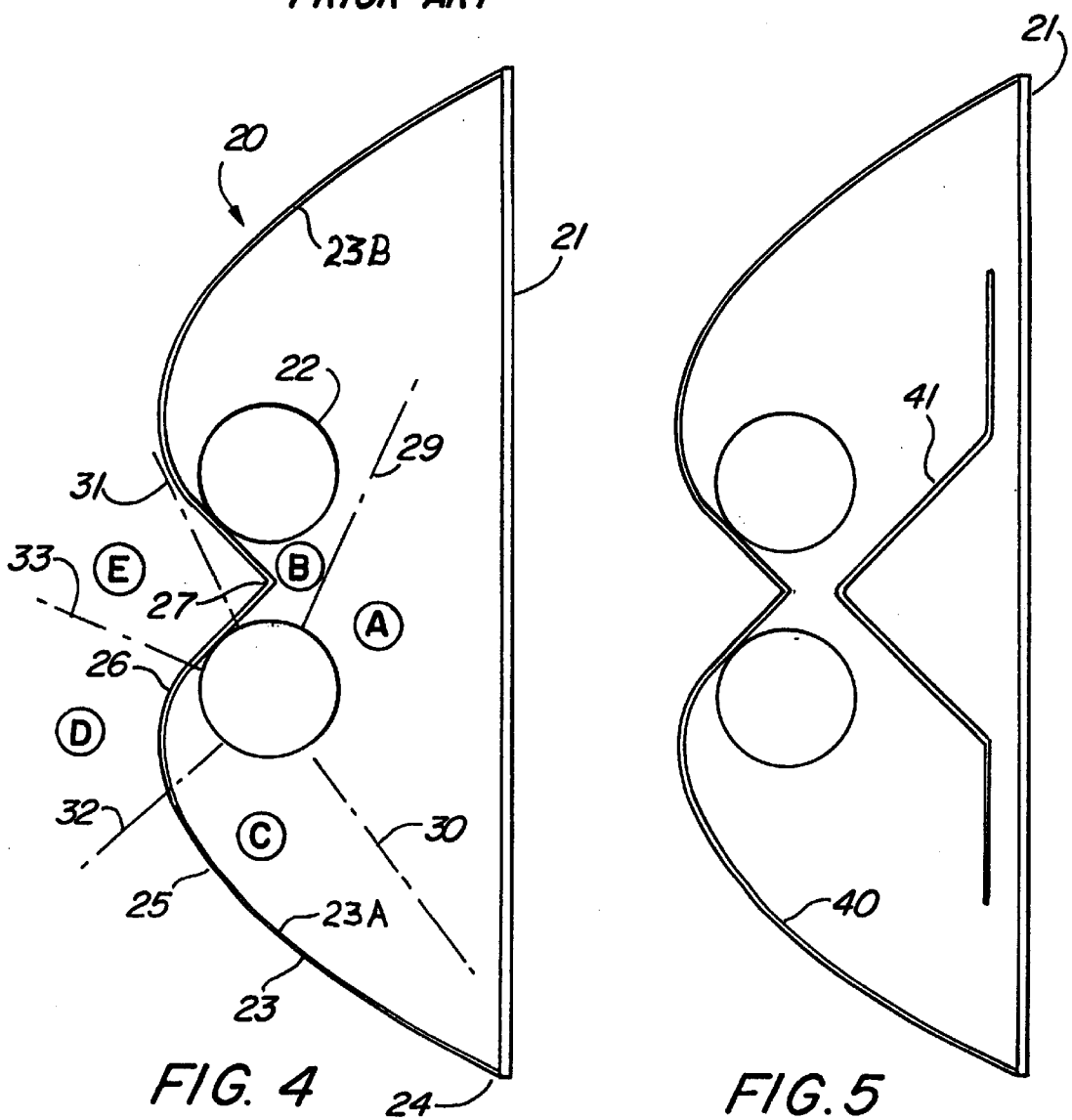
FIG. 3
PRIOR ART
FIG. 4
FIG. 5

LOW PROFILE BACKLIGHT OPTIMIZED FOR LIQUID CRYSTAL DISPLAYS

CROSS REFERENCE TO RELATED APPLICATION

This Application relates to U.S. patent application, Ser. No. 09/364,378, entitled LIQUID CRYSTAL DISPLAY DEVICE USING AN ELECTRODELESS LAMP, filed Jul. 30, 1999; and; to U.S. patent application Ser. No. 09/974, 126, entitled DIMMABLE BALLAST FOR ELECTRODE-LESS FLUORESCENT LAMPS, filed Oct. 8, 2001. Both Applications are incorporated herein by reference.

BACKGROUND OF THE INVENTION

1. Field of the Invention

The present invention relates to a structure for providing backlight for a liquid crystal display, which structure has been optimized for uniformity.

2. Description of Related Art

Liquid crystal materials emit no light of their own. They do however reflect and transmit light from external light sources. Liquid Crystal Displays ("LCD") are rapidly becoming the display material of choice for new, high-technology displays.

Accordingly, it is necessary to back light the LCD, which is typically done with fluorescent lamps located directly behind the LCD. When illuminated from behind, a white diffusion sheet between the backlight and the LCD redirects and scatters the light evenly to ensure a uniform display. When light is transmitted through filters, layers of liquid crystal, electrode layers, polymer films, etc., more than eighty percent (80%) of the light is lost.

Fluorescent lights have a limited useful life and become dim over time. However, there is a new type of electrodeless fluorescent lamp available today that has a substantially longer life span than the electrode variety. Such lamps are manufactured and sold by Sylvania under the trade name ICETRON. These lamps are oval in shape and include a coil at each end for excitation thereof In order to get the light intensity needed for many of today's modem display requirements, it is necessary to employ a large ICETRON lamp. The problem however, is that this lamp takes up a lot of space and would require a very thick display cabinet (i.e., very deep).

Therefore, a need exists for an optimized back lighting arrangement that is small in size (i.e., very thin), one that produces light with ample brightness and one that has a long life span.

SUMMARY OF THE INVENTION

Accordingly, a feature of the present invention is the provision of high intensity light source for use as a back light for LCD'S.

Another feature of the present invention is the provision of a light source for use in a trim LCD display panel.

Yet another feature of the present invention is the provision of a light source assembly that evenly distributes bright light across the back surface of an LCD panel.

These and other features, which will become apparent as the invention is described in detail below, are provided by an apparatus that provides back light for liquid crystal displays ("LCD"). The apparatus includes an electrodeless lamp disposed in a cabinet for generating light; and a reflector disposed on one side of the electrodeless lamp for directing light from the lamp in the direction of the LCD and a diffuser. The reflector further includes a surface profile that provides a uniform distribution of light intensity into the LCD. The reflector further is adjacent and in close proximity with the lamp in order to provide a minimum depth behind the lamp. An alternate embodiment of the invention includes an IR reflector disposed between the electrodeless lamp and a diffuser, which is located adjacent the LCD screen.

Still other features and advantages of the present invention will become readily apparent to those skilled in the art from the following detailed description, wherein is shown and described only the preferred embodiment of the invention, simply by way of illustration of the best mode contemplated of carrying out the invention. As will be realized, the invention is capable of other and different embodiments, and its several details are capable of modifications in various obvious respects, all without departing from the invention. Accordingly, the drawings and description are to be regarded as illustrative in nature, and not as restrictive, and what is intended to be protected by Letters Patent is set forth in the appended claims. The present invention will become apparent when taken in conjunction with the following description and attached drawings, wherein like characters indicate like parts, and which drawings form a part of this application.

BRIEF DESCRIPTION OF THE DRAWINGS

The general purpose of this invention, as well as a preferred mode of use, its objects and advantages will best be understood by reference to the following detailed description of an illustrative embodiment with reference to the accompanying drawings in which like reference numerals designate like parts throughout the figures thereof, and wherein:

FIG. 3 is a diagram of a cross-section of the prior art back-light structure;

FIG. 4 is a diagram of a cross-section of the back-light assembly constructed in accordance with the present invention; and FIG. 5 is a diagram of a cross-section of the back-light assembly constructed in accordance with an alternate embodiment of the present invention.

DETAILED DESCRIPTION OF THE PREFERRED EMBODIMENTS

Figure 1:
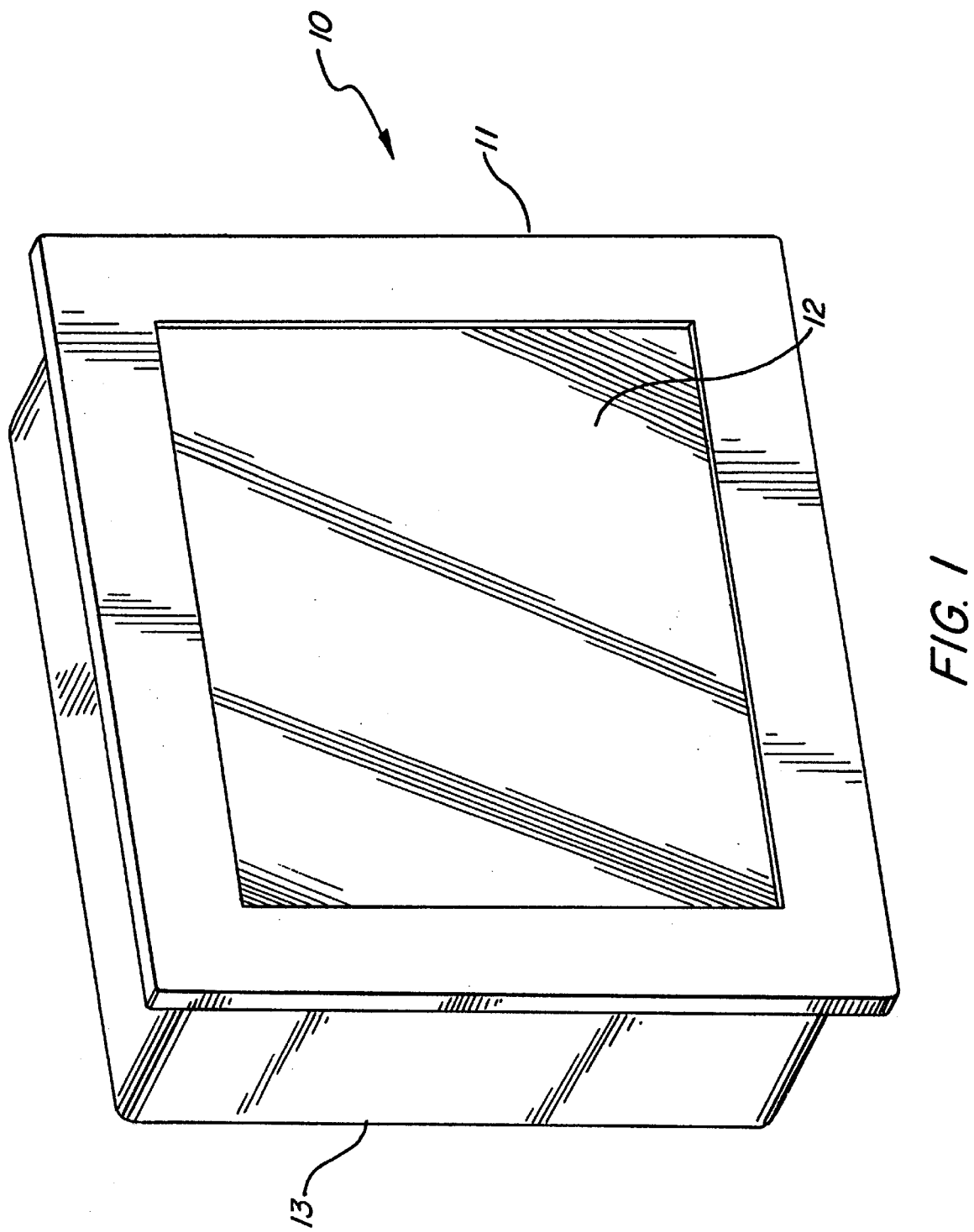
FIG. 1 illustrates a perspective view of an LCD display employing the back-light assembly in accordance with the present invention.

Referring now to the drawings and FIG. 1 in particular, a perspective view of an LCD display 10 employing the back-light assembly (not shown) in accordance with the present invention is shown. The display 10 includes a frame 11 and a screen 12. Behind the screen 12 is located a back-light assembly, which assembly is housed in a cabinet 13 and will be amplified hereinafter.

Figure 2:
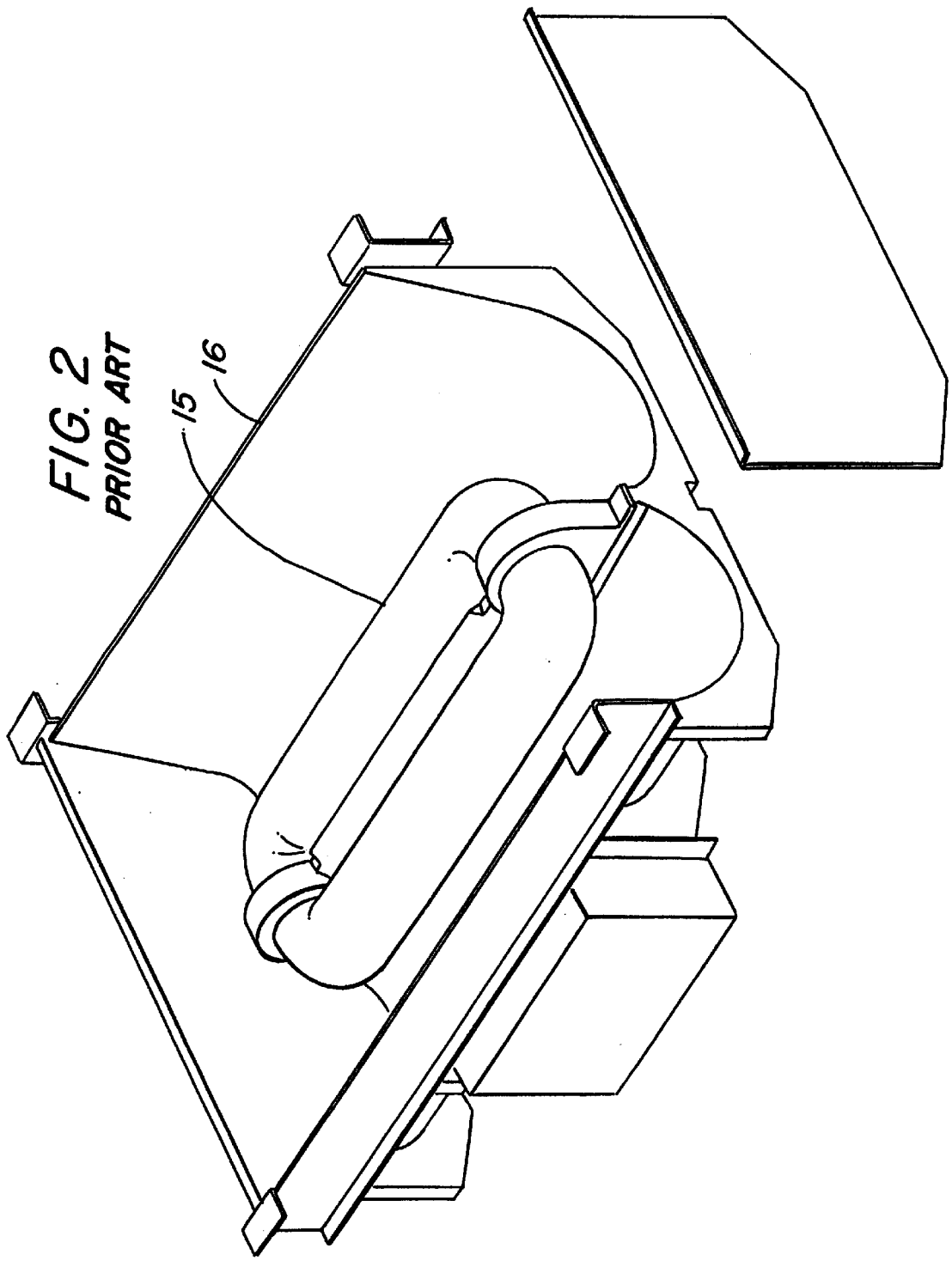
FIG. 2 illustrates an exploded perspective view of a prior art backlight structure.

With reference to FIG. 2, a prior art lamp apparatus is shown with an oval-shaped electrodeless fluorescent lamp 15 disposed in a reflector assembly 16 for providing the light necessary to illuminate the LCD screen 12. The lining of the assembly 16 is made of a reflective material so as to maximize the amount of light emitted therefrom. Also, the shape of the assembly is important for maximizing light reflection. This shape may be more readily seen with reference to the cross-sectional diagram of FIG. 3.

Referring now to FIG. 3, a cross-section of the prior-art light reflector assembly 16 is shown. Each half of the reflector 16 is shaped like a spiral. The inner part of each half, 16A and 16B, converge on a central semi-diamond shaped member 17 located parallel to the lamp halves 15. This shape of the reflector 16 reflects a maximum amount of light from the lamp 15, and the semi-diamond shaped member 17 adds to the light reflection by picking up light emitted between the two sides 15A and 15B of the lamp 15. This reflector profile requires a large volume of space behind the lamp.

As described in the aforementioned co-pending patent application, the lamp 15 is preferably an inductively coupled electrodeless lamp, such as sold by OSRAM SYLVANIA Products, Inc., located in Danvers, Mass., USA, under the product names, ICETRON™ 100 and ICETRON™ 150, which are described in a SYLVANIA ICETRON Design Guide, Document No. FL022 07/98. These lamps use magnetic-induction technology for operation instead of an electrode at each end of the tube. The lamp 15 is excited by a radio frequency (RF) magnetic field-supplied by a pair of lamp transformers, or drive inductors. The ICETRON™ lamps operate at a typical frequency of 250 KHz.

Referring now to FIG. 4, a cross-sectional view of a back light apparatus 20 constructed in accordance with the present invention is shown. A diffuser 21 is located approximately 1.5 inches in front of an edge of an electrodeless lamp 22. The lamp 22 may be an ICETRON™ 100 or 150 lamp as described above. A reflector 23 is shaped different from the prior art reflector 16 in order to reduce the depth of the reflector behind the lamp and to optimize uniformity. The reflector requires a complex profile to optimize the direction and distribution of light into the LCD. In particular, the reflector 23 profile can be described as parabolic in shape between points 24 and 25 (as shown in FIG. 4), an arc of a circle between points 25 and 26, and a straight line between points 26 and 27. The reflector 23 is symmetrical in that each half 23A and 23B of the reflector 23 is constructed with the same series of shapes as described above.

The light emitting from the lamp 22 has several different paths to the diffuser 21 and LCD panel (not shown). Direct light from the top of the lamp 22, which radiates from an arc defined by dashed lines 29 and 30 (hereinafter defined as region A) is approximately 40% of the total light emitted by the lamp. Reflected light from the sides of the lamp, emitted in arcs between dashed lines 29 and 31 and 30 and 32 (hereinafter defined as regions B and C, respectively), is approximately 30% of the total light emitted by the lamp 22. Multiple reflections emitted from the back of the lamp 22, as defined by an arc between the dashed line 32 and a dashed line 33 (hereinafter defined as region D), is approximately 20% of the total light emitted by the lamp 22. Finally, the light reflected back into the lamp 22 from the lamp halves, as defined by an arc between the dashed lines 31 and 33 (hereinafter defined as region E), is approximately 10% of the total light emitted.

For an understanding of the performance of the reflector in close proximity to a relatively large lamp, the above-described light emitting paths will be further described. The reflector surface shown in region B reflects light toward the LCD. About one half of the light in region B will be absorbed or diffused by the opposite lamp segment. The light in region E will be directed back into the lamp where it will be absorbed or diffused. This diffused portion of light will add to the light emitted toward the LCD.

The surface area of the reflector 23 is specular in order to control the direction of reflected light. In an alternate embodiment, the outer areas of the reflector 23 may use a diffused white surface to act as an emitting surface, as perceived by the diffuser 21. Adjustment of these surface areas of the reflector 23 is used to obtain the desired uniformity of light emitted.

Referring now to FIG. 5, an alternate embodiment of the present invention is shown. Normally, the back light directed at the LCD panel has a large amount of Infra-Red ("IR") energy or heat. For thermal control of the back light, the specular reflector 23 can be made from new specular reflective materials available from 3M Corporation, which has some IR transmission. This function is described as a "cold mirror" because it reflects mostly visible light. In this way, the radiated heat of the lamp can be absorbed by material behind the reflector. This absorbing surface could be a reflector substrate 40 or the enclosure itself. By employing such material, which usually comes in a film, it is practical to also use an IR reflective film 41 just behind the diffuser 21. This film will transmit visible light and reflect IR ("hot mirror"). The reflector profile 41 shown in FIG. 5 will direct most of the lamp's IR energy toward the reflector itself. Such a configuration reduces the thermal loading on the LCD panel, but at the expense of some attenuation of the light output.

While the invention has been particularly shown and described with reference to a preferred embodiment, it will be understood by those skilled in the art that various changes in form and detail may be made therein without departing from the spirit and scope of the invention.

Those skilled in the art will appreciate that various adaptations and modifications of the just-described preferred embodiments can be configured without departing from the scope and spirit of the invention. Therefore, it is to be understood that within the scope of the appended claims, the invention may be practiced other than as specifically described herein.

What is claimed is:

1. A light emitting apparatus for use with displays comprising:
   a. an electrodeless lamp for generating light;
   b. a reflector disposed on one side of said electrodeless lamp and in close proximity thereto for directing light toward said display, said reflector including a pair of identically shaped surfaces wherein a portion of each shaped surface includes a parabolic section;
   c. an IR transparent reflective material located between the reflector and the lamp, to reflect mostly visible light and absorb the IR; and
   d. an IR reflective material located between the lamp and the display to reflect mostly IR and transmit visible light; whereby thermal loading on the display is reduced.

2. The apparatus as in claim 1 wherein said display is a liquid crystal display.

3. The apparatus as in claim 1 wherein said reflector surfaces are specular.

4. The apparatus as in claim 1 further including a diffuser panel disposed in front of said lamp and the IR reflective material.

5. The apparatus in claim 1 further including a surface profile of said IR reflective material that substantially reflects IR toward said reflector and not toward said lamp.

6. The apparatus as in claim 1 wherein each shaped surface further comprises a an arcuate section, followed by a linear section following the parabolic section.

7. An apparatus as in claim 1 wherein outer areas of said reflector are coated with a diffuse white surface to act as a light emitting surface.

8. A light emitting apparatus for use with a liquid crystal display ("LCD") comprising:

a. an electrodeless lamp for generating light; and b. a reflector for directing light away from said electrodeless lamp in the direction of the LCD, said reflector including a pair of identically shaped surfaces wherein each shaped surface is a combination of a parabolic section followed by, an arcuate section followed by a linear section.

9. The apparatus as in claim 8 wherein the reflector surfaces are specular.

10. The apparatus as in claim 8 further including a diffuser panel disposed in front of said lamp.

11. The apparatus as in claim 10 further including an IR transparent reflector material located between the reflector and the lamp and an IR reflective film located between the lamp and the diffuser panel, in order to reduce thermal loading on the LCD.

12. The apparatus as in claim 11 further including a surface profile of said IR reflective film that substantially reflects IR toward said reflector and not toward the LCD.

13. An apparatus for providing a back light for a liquid crystal display ("LCD") comprising:

a. an electrodeless lamp for generating light; and b. a reflector disposed on one side of said electrodeless lamp for directing light from said lamp in the direction of said LCD, said reflector including a pair of identically shaped surfaces wherein each shaped surface is a combination of a parabolic section, followed by an arcuate section, followed by a linear section; thereby allowing said electrodeless lamp to be placed closer to said reflector and reducing the size of the apparatus.

14. The apparatus as in claim 13 wherein said reflector surfaces are specular for reflecting light generated by said electrodeless lamp.

15. The apparatus as in claim 13 further including a diffuser panel disposed in front of said lamp for redirecting and scattering light from said electrodeless lamp.

16. The apparatus in claim 15 further including an IR reflective film between said lamp and said diffuser panel in order to reduce thermal loading on said LCD.

17. The apparatus in claim 16 further including a surface profile of said IR reflective film that substantially reflects IR toward said reflector and not toward said lamp.

18. An apparatus as in claim 13 wherein outer areas of said reflector are coated with a diffuse white surface to act as a light emitting surface.

19. An apparatus as in claim 13 wherein said reflector is in near contact with said lamp in order to provide a minimum depth behind said lamp.

* * * * *